United States Patent [19]

Graafland et al.

[11] Patent Number: 5,795,944
[45] Date of Patent: Aug. 18, 1998

[54] PROGRAMMED ADDITION OF HEAVY ETHERS FOR MICROSTRUCTURE CONTROL OF DIENE POLYMERS

[75] Inventors: Teunis Graafland, Overeen, Netherlands; Arthur Robinson Bean, Jr., Houston, Tex.

[73] Assignee: Shell Oil Company, Houston, Tex.

[21] Appl. No.: 820,404

[22] Filed: Mar. 12, 1997

Related U.S. Application Data

[60] Provisional application No. 60/013,549 Mar. 18, 1996.
[51] Int. Cl.⁶ .................. C08F 236/10; C08F 297/04
[52] U.S. Cl. .................. 526/181; 526/173; 526/174; 526/209; 525/243; 525/250; 525/253; 525/258; 525/271; 525/314; 525/315; 525/316

[58] Field of Search ............... 526/173, 174, 526/181, 209; 525/243, 250, 253, 258, 271, 314, 315, 316

[56] References Cited

U.S. PATENT DOCUMENTS 4,577,002  3/1986  Broekhuis ............... 526/181
5,241,008  8/1993  Hall ......................... 525/314

Primary Examiner—Frederick Krass
Attorney, Agent, or Firm—Donald F. Haas

[57] ABSTRACT

A process for the polymerization of dienes which comprises anionically polymerizing dienes in the presence of an anionic polymerization initiator and a microstructure control agent is improved by adding the control agent to the polymerization mixture in two or more doses to closely control the vinyl content of the polymer produced.

5 Claims, 2 Drawing Sheets

PROGRAMMED ADDITION OF HEAVY ETHERS FOR MICROSTRUCTURE CONTROL OF DIENE POLYMERS

CROSSREFERENCE TO RELATED APPLICATIONS

This application claims the benefit of U.S. Provisional Application No. 60/013,549, filed Mar. 18, 1996.

BACKGROUND OF THE INVENTION

This invention relates to anionic polymerization of dienes and the control of the microstructure of the diene polymer or diene polymer blocks in the polymer. More specifically, the invention relates to an improved method for closely controlling the microstructure of such polymers.

Polymer of conjugated dienes have been produced by numerous methods. However, anionic polymerization of such dienes in the presence of an anionic polymerization initiator is the most widely used commercial process. The polymerization is carried out in an inert solvent such as hexane, cyclohexane or toluene and the polymerization initiator is commonly an organo alkali metal compound, especially alkyl lithium compounds.

Microstructure control of conjugated diene polymers or conjugated diene polymer blocks within polymers is important because a controlled degree of branching in the polymer is desirable. If, such as in the case of butadiene, the diene in the polymer is all straight chain, such as 1,4-polybutadiene, when the polymer is hydrogenated it will be polyethylene and have crystallinity. In order to achieve good thermoplastic elastomeric properties in the polymer, it is desirable that the microstructure include a uniform specific degree of branching or vinyl content, such as 1,2-butadiene possesses. This will ensure that the desired thermoplastic elastomeric properties are achieved primarily glass transition temperature ($T_g$) and hardness.

The desired control of the microstructure to include a desired amount of branching or vinyl content is commonly effected by including a microstructure control agent in the polymerization mixture. The desired level of vinyl content is achieved by properly selecting the type and the amount of these microstructure control agents, which are commonly Lewis basic compounds. Such compounds have included ether compounds and tertiary amines. Examples include cyclic ethers such as tetrahydrofuran, tetrahydropyran and 1,4-dioxane; aliphatic monoethers such as diethyl ether and dibutyl ether; aliphatic polyethers such as ethylene glycol dimethyl ether, ethylene glycol diethyl ether, ethylene glycol dibutyl ether, diethylene glycol diethyl ether and diethylene glycol dibutyl ether; aromatic ethers such as diphenyl ether and anisole; tertiary amine compounds such as triethyl amine, tipropyl amine, tributyl amine; and other compounds such as N,N,N',N'-tetramethylethylene diamine, N,N-diethyl aniline, pyridine and quinoline.

Many of these microstructure control agents are temperature sensitive. In other words, they will produce varying amounts of vinyl content in the diene polymer at different temperatures. Thus, if a constant vinyl content is required in the polymer, the polymerization must be carried out isothermally. Diethyl ether is often used because it is not as temperature sensitive as the others and does not require isothermal operation. Diethyl ether, however, has disadvantages. It is not as effective in producing vinyl content as other ethers and larger amounts of it have to be used. In fact, the amounts which are necessary require that it be separated from the main solvent, such as cyclohexane, in the case of a block polymerization with, for example, styrene, whose polymerization must be ether-free because ether kills too many of the styrene polymer chains. Separation of the diethyl ether is an additional step which increases the cost since it has to be purified and stored for reuse. Further, diethyl ether only allows up to about 38% vinyl content in butadiene polymers or butadiene polymer blocks. For some applications, it may be desired to achieve a higher vinyl content. Another disadvantage of diethyl ether is that it cannot be separated from some solvents such as isopentane.

It would be advantageous to utilize a process for microstructure control which did not have to be operated isothermally. Further, it would be an advantage to be able to utilize a microstructure control agent which did not have to be used in large amounts requiring separation from the main solvent and purification. It would also be advantageous to be able to vary the microstructure of the polymer produced during the polymerization process. The present invention as described below provides such advantages.

SUMMARY OF THE INVENTION

The present invention is an improvement upon the known process for the polymerization of dienes which comprises anionically polymerizing dienes in the presence of an anionic polymerization initiator and a microstructure control agent which is used for control of the vinyl content of the polymer. The improvement to this process comprises adding the control agent to the polymerization mixture in two or more doses.

In a preferred embodiment of the present invention, the polymerization is carried out in a first adiabatic stage and a second isothermal stage. The control agent is added to the polymerization mixture in two or more doses during the adiabatic stage in amounts and at times sufficient to maintain the desired vinyl content of the polymer relatively constant. In another embodiment of the present invention, the control agent is added in amounts and at times such that diene blocks with substantially different vinyl contents are produced in the polymer. The preferred microstructure control agents for use herein are 1,2-diethoxy-ethane and 1,2-diethoxy-propane.

DETAILED DESCRIPTION OF THE INVENTION

Figure 1:
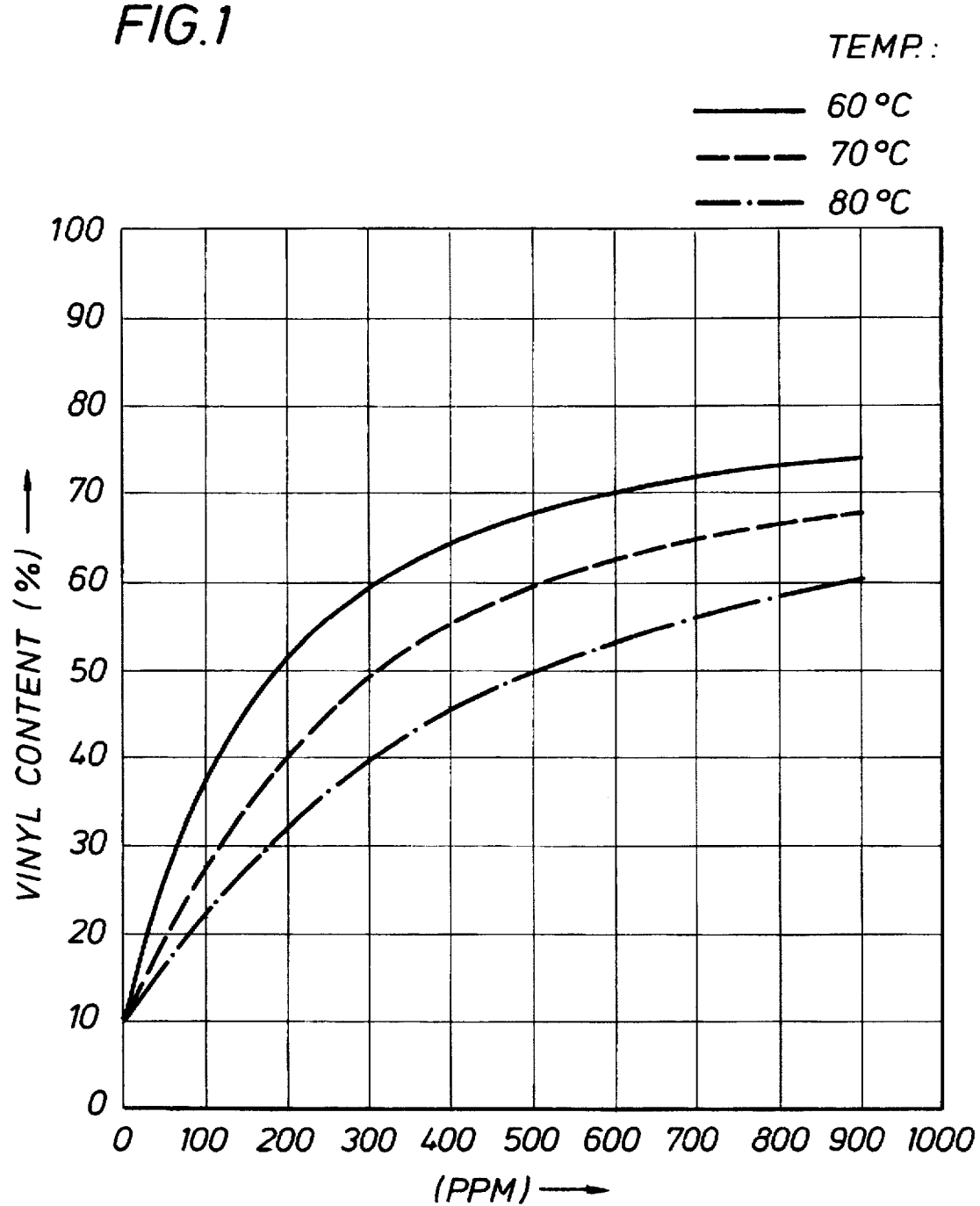
FIG. 1 is a plot of the temperature/vinyl content relationship for butadiene-styrene block copolymers made using 1,2-diethoxy propane.

As is well known, polymers containing both ethylenic and/or aromatic unsaturation can be prepared by copolymerizing one or more polyolefins, particularly a diolefin, by themselves or with one or more alkenyl aromatic hydrocarbon monomers. The polymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. The radial polymers may, then, be symmetric or asymmetric.

As discussed above, it is common practice to control the microstructure of the diene polymer, i.e. the vinyl content (the 1,2-content in the case of polybutadiene), by adding to the polymerization mix a microstructure control agent. As discussed above, these are usually Lewis base compounds. They are added in one dose to the polymerization mix and the total vinyl content of the polymer is controlled by adjusting the ratio of the microstructure control agent and the polymerization initiator and/or the polymerization temperature.

Before the process of this invention is carried out, the desired final vinyl content of the polymer must be chosen and the temperature profile of the reaction must be determined. The temperature is determined by the temperature of the feed and the total heat release during the reaction. Next, the temperature/vinyl content/concentration relationship for the desired ether is utilized. This is determined by reacting the monomers with the ether at different temperatures and measuring the vinyl contents. These data can be plotted as shown in FIG. 1.

The data are used to determine how much ether is to be added to keep the vinyl content constant at different temperatures as the temperature increases. The ether may be added in two or more doses at different temperatures. Continuous addition is the ideal technique to give the closest possible control of the vinyl content. For expediency we approximate continuous addition with a series of doses. The number of doses depends on the toal temperature change. More doses are required for greater temperature increases. The starting temperature indicates the initial concentration and more will be needed as the temperature rises in the adiabatic portion of the reaction according to the predetermined temperature profile.

Many microstructure control agents can be used to advantage in the process of the present invention. These include the aforementioned compounds and heavy ethers which are difficult to use in the present practice because they are temperature sensitive. Such heavy ethers include 1,2-diethoxy-ethane, 1,2-diethoxy-propane, orthodimethoxybenzene, 1,2-di-n-butoxy-ethane, 1-t-butoxy-2-n-butoxy-ethane, n-$C_4H_9OCH_2CH_2O$-n-$C_4H_9$, n-$C_4H_9OCH_2CH_2OCH_2OCH_3$, n-$C_4H_9OCH_2CH_2OCHCH_3OCH_2CH_3$, n-$C_4H_9OCH_2CH_2O$-t-$C_4H_9$, n-$C_4H_9OCH_2CH_2OCHCH_3$-O-i-$C_4H_9$. These are heavy ethers which are stronger and can be used in smaller amounts than the presently used diethyl ether and thus, do not require recovery, storage, and treatment facilities, making the overall process less expensive to operate. They can be separated from recovered solvents like isopentane for economic reasons. In fact, it is preferred that from 100 ppm to 300 ppm of the heavy ethers be used as the microstructure control agent to achieve the desired vinyl content. This amount may be split equally between the different doses of the agent which are added to the polymerization mix or varying amounts may be added at various points as required or it may be added continuously.

As discussed above, many of these microstructure control agents are temperature sensitive. As the temperature goes up, they become less effective and the vinyl content in the polymer produced goes down. Adding more microstructure control agent to the polymerization mix as the temperature rises helps keep the microstructure the same, i.e. the vinyl content does not vary appreciably. If this can be achieved, then the process does not have to be run isothermally, a difficult state to achieve. For reproducibility and control in the polymerization process it is much easier to start up the process and run the process wherein the startup portion of the process is carried out adiabatically and the rest of the process is carried out isothermally. Thus, the microstructure control agent is added to the polymerization mix during the startup or adiabatic portion of the process to maintain constant microstructure during that time. Addition of microstructure control agent is not normally necessary during the second or isothermal stage of the process because under that condition, the microstructure should not change appreciably.

Another important advantage is that diene blocks of different vinyl contents can be produced within the same polymer. For instance, a first diene polymer block can be produced with a desired vinyl content by adding a certain amount of a microstructure control agent. As the polymerization proceeds, a second amount of microstructure control agent can be added to the polymerization mix to produce a second diene block which has a higher vinyl content. Thus, the properties of the polymer can be varied along the length of the polymer as well as its propensity to react to add various functionalizing agents such as epoxy, hydroxyl, amines, anhydrides, etc. to the polymer chain.

EXAMPLES

In the following experiments, styrene-butadiene-styrene block copolymers were produced. The general polymerization scheme for this polymer is shown below:

TABLE 1

Dioxo Recipe
Below the recipe is given which served as base for the experiments described. Some values were adjusted during the course of the experiments (see Tables).
Polymer: 12% solids; cy-C6/i-C5 75/25 w/w; 500 lb total.

| Temp. 2nd step | | Polymer 70° C. |
|---|---|---|
| Step I: | | |
| CH | (lb) | 176 |
| Total Sty | (lb) | 9.9 |
| BuLi | (mmole) | 155 |
| Reaction temp | (°C.) | 30–60 |
| Reaction time | (min) | 30 |
| Step II: | | |
| CH | (lb) | 154 |
| IP | (lb) | 110 |
| Dioxo | (g) | 29.6 |
| Bd rate | (lb/min) | 1.005 |
| Bd dosing time | (min) | 40 |
| Soak time | (min) | 35 |
| Step III: | | |
| Temp | (°C.) | 60 |
| Total Sty | (lb) | 9.9 |
| Sty dosing time | (min) | 4 |
| Soak time | (approx; min) | 10 |

Cy-C6 = Cyclohexane = CH
i-C5 = isopentane = IP
dioxo = 1,2-diethoxy ethane
Bd = butadiene
Sty = styrene
Bu Li = butyl lithium The step II and III polymerizations were carried out in a cyclohexane/isopentane mixture. Part of the butadiene was added batch-wise and the titration of the solvent was carried out by heat detection. The microstructure control agent, 1,2-diethoxy-ethane, was added after completion of the titration. After step I and during step II, samples were taken every 5 to 10 minutes to determine the molecular weight buildup (by gel permeation chromatography) and to determine the vinyl and styrene contents (by $^1$H NMR).

This polymer was hydrogenated. The hydrogenation was carried out using a nickel octoate/triethyl aluminum catalyst. After hydrogenation, the polymer cement was acid washed and neutralized. The mixing time was 30 minutes and the phases were allowed to separate for 15 minutes. The pH of the water phase was then about 10. The polymer was then recovered by steam coagulation.

Run 4055 was carried out by semi-adiabatic temperature profile during step II, polymerizing 50% of the butadiene batch-wise. Commencing at 30° C., the temperature was allowed to rise to 70° C. without cooling. Then cooling was started in order to maintain the temperature at 70° C. while adding the rest of the butadiene. The amount of microstructure control agent used was 130 ppm. In Run 4056, only 25% of the butadiene was polymerized batch-wise according to a semi-adiabatic temperature profile. In this case, the microstructure control agent was charged in three steps in order to compensate for the temperature gradient. At the beginning of step II, 55 parts per million was charged at 40° C., followed by 40 parts per million at 55° C. and the final 35 parts per million at 70° C.

The polymerization process data is shown below in Table 2:

TABLE 2

| Polymerization Process Data | | | |
|---|---|---|---|
| Run no. | | 4055 | 4056 |
| Step I: | | | |
| Reaction time | (min) | 29 | 30 |
| Transfer Temp | (°C.) | 46 | 55 |
| Step II: | | | |
| Temp. | (°C.) | 30–70 | 40–70 |
| Titration | (ml) | 15 | 12 |
| Dioxo | (ppm) | 130 | 55/40/35 |
| Batch Bd | (lb) | 25.16 | 12.58 |
| Bd rate | (lb/min) | 1.3 | 1.3 |
| Total Bd | (lb) | 50.3 | 50.3 |
| Soak time | (min) | 30 | 30 |
| Step III: | | | |
| Temp. | (°C.) | 70–74 | 70–74 |
| Soak time | (min) | 10 | 10 |
| Sty rate | (lb/min) | 3.1 | 3.1 |
| Total Sty | (lb) | 12.34 | 12.34 |

The analytical data showing the results of the tests on the samples which were taken during and after the polymerization are shown below in Table 3:

TABLE 3

| Analytical Data | | | |
|---|---|---|---|
| Run no. | | 4055 | 4056 |
| Step I: | | | |
| MW$^1$ | (*10$^{-3}$) | 29.0 | 27.3 |
| Step II: | | | |
| MW$^1$ | (*10$^{-3}$) | 242.6 | 243.5 |
| Vin cont | (%) | 45.1 | 43.2 |
| Sty cont | (%) | 19.2 | 18.7 |

TABLE 3-continued

Analytical Data

| Run no. | | 4055 | 4056 |
|---|---|---|---|
| Step III: | | | |
| MW[1] | (*10$^{-3}$) | 275.9 | 277.3 |
| Vin cont | (%) | 45.0 | 43.0 |
| Sty cont | (%) | 32.7 | 32.0 |

[1] Apparent MW

Figure 2:
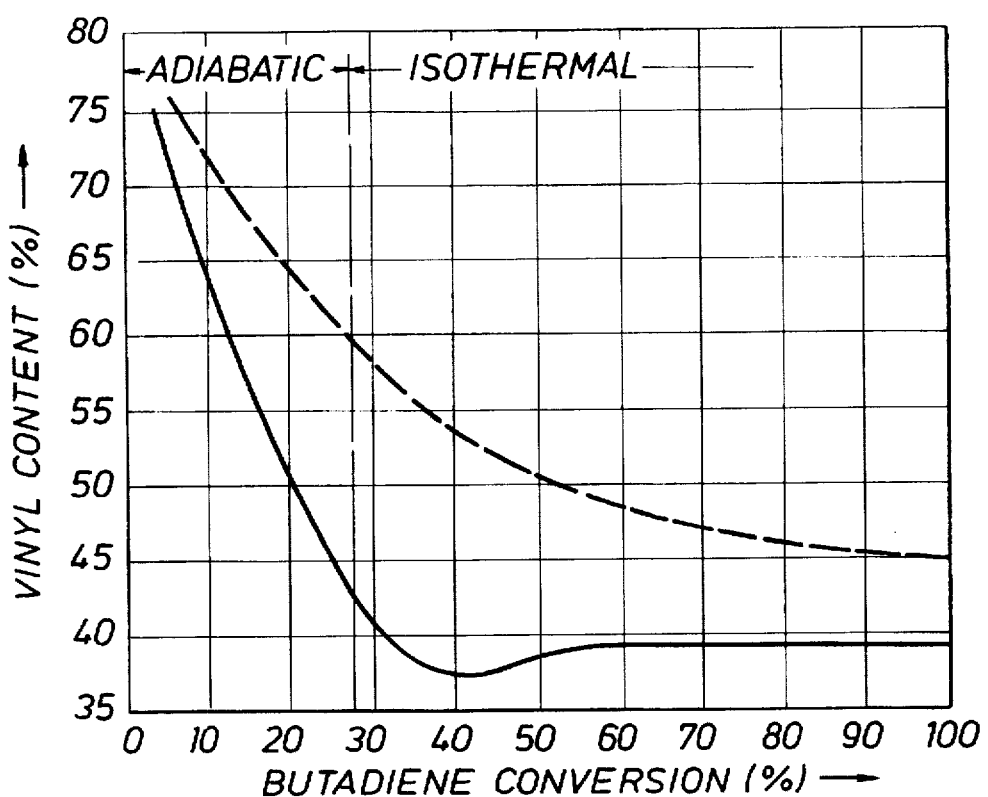
FIG. 2 is a plot of vinyl content versus butadiene conversion for a conventional one step process.
Figure 3:
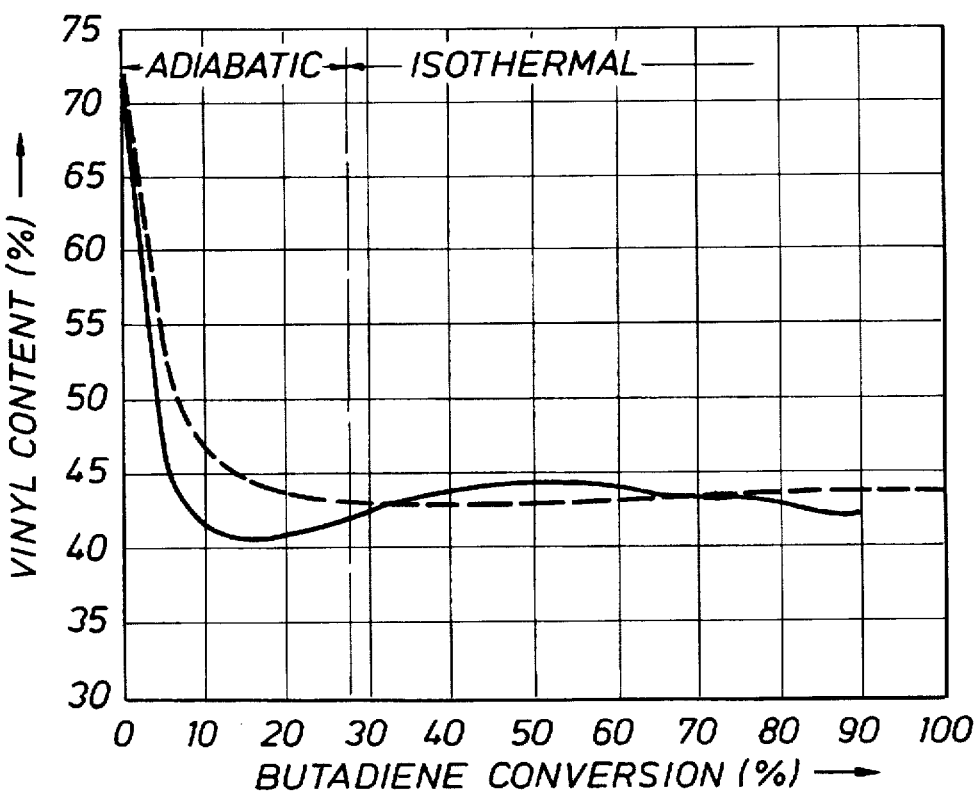
FIG. 3 is a similar plot for a three step addition process.

On both FIGS. 2 and 3, the solid line shows the instantaneous or immediate vinyl distribution and the dotted line shows the average vinyl content of the polymer produced up to a particular time. FIG. 2 shows the effect of using one dose of the microstructure control agent in the partially adiabatic process described above. The figure plots the vinyl distribution in the butadiene midblock as a function of butadiene conversion. It can be seen that the vinyl content tapers from 75% to about 40% and doesn't become uniform until 30% conversion (constant temperature point). This is due to the high temperature sensitivity of the microstructure control agent used.

In Run 4056, the temperature change was compensated for by adding the microstructure control agent in three steps as discussed above. These results are shown in FIG. 3. The figure shows that the vinyl content became uniform at about 5% conversion and was maintained even though the temperature increased.

It can be seen in FIG. 2 that the vinyl distribution drops off drastically and is much lower than the average distribution. However, when the process of the present invention is used (FIG. 3), it can be seen that the actual vinyl distribution can be controlled such that it is very close to the cumulative distribution. This is important because it confirms that the actual instantaneous vinyl content is remaining at the needed level and not dropping off with temperature.

The tensile properties of the polymers after they were hydrogenated were determined. These tensile properties are shown in the following Table 4:

TABLE 4

Stress-strain tensile and Shore A hardness values for hydrogenated and compounded polymers[1].

| Elongation | Stress (psi) | |
|---|---|---|
| (%) | 3966 | 4056 |
| 100 | 124 | 136 |
| 300 | 204 | 218 |
| 500 | 307 | 339 |
| TB[2] | 976 | 952 |
| EB[3] (%) | 950 | 900 |
| Shore A Hardness | 49 | 45 |

[1] Average values
[2] Tensile at break
[3] Elongation at break

Where #3966 represents product resulting from process using nontemperature sensitive modifier, diethyl ether; and #4056 represents product from process using temperature sensitive modifier, dioxo, but employs the technique embodied here to compensate for temperature variation.

The data in Table 4 show that the tensile properties of the two polymers are very similar. This means that several of the important product characteristics of products made according to the prior art process can be duplicated using the new and improved process which, in addition, produces a polymer with a highly uniform vinyl content which, past experience has taught, will produce a polymer with desired overall thermoplastic elastomeric properties especially $T_g$.

TABLE 5

Actual Measurement v. Predicted $T_g$

| Sample | PS % w | PE % w | PB % w | Tg (predicted) °C. | Tg (measured) °C. |
|---|---|---|---|---|---|
| 4055 | 28.27 | 38.16 | 33.25 | −46 | −48 ± 2 |
| 4056 | 30.59 | 40.14 | 29.07 | −48 | −47 ± 1 |
| 4060 | 30.19 | 41.97 | 27.65 | −49 | −49 ± 1 |

According to the Fox Equation, we predict the $T_g$ of the mid-block for the three materials. There is only a three ° C. difference among the three materials. Our measurement results cover the predicted values, but the error bars of the instrument and the variations in sample preparation are not small enough to differentiate themselves.

We claim:

1. In a process for the polymerization of dienes which comprises anionically polymerizing dienes in the presence of an anionic polymerization initiator and a microstructure control agent for control of the vinyl content of the polymer, the improvement which comprises carrying out the polymerization in a first adiabatic stage and a second isothermal stage wherein the control agent is added to the polymerization mixture in two or more doses during the adiabatic stage in amounts and at times sufficient to maintain a constant polymer vinyl content.

2. The process of claim 1 wherein the control agent is selected from the group consisting of 1,2-diethoxyethane, 1,2-diethoxypropane, 1,2-di-n-butoxy-ethane, 1-t-butoxy-2-n-butoxy-ethane, n-C$_4$H$_9$OCH$_2$CH$_2$O-n-C$_4$H$_9$, n-C$_4$H$_9$OCH$_2$CH$_2$OCH$_2$OCH$_3$, n-C$_4$H$_9$OCH$_2$CH$_2$OCHCH$_3$OCH$_2$CH$_3$, n-C$_4$H$_9$OCH$_2$CH$_2$O-t-C$_4$H$_9$ and n-C$_4$H$_9$OCH$_2$CH$_2$OCHCH$_3$-O-i-C$_4$H$_9$.

3. The process of claim 2 wherein the control agent is 1,2-diethoxyethane or 1,-2-diethoxypropane.

4. The process of claim 1 wherein the control agent is used in an amount of from 100 to 300 ppm.

5. The process of claim 1 wherein the control agent is added in amounts and at times such that diene blocks with different vinyl contents are produced.

* * * * *